Oct. 31, 1967 LE ROY O. KITTELSON 3,349,463
METHOD FOR MAKING VALVES FOR INTERNAL COMBUSTION ENGINES
Filed Aug. 6, 1964

INVENTOR.
LEROY O. KITTELSON

United States Patent Office 3,349,463
Patented Oct. 31, 1967

3,349,463
METHOD FOR MAKING VALVES FOR
INTERNAL COMBUSTION ENGINES
Le Roy O. Kittelson, Seattle, Wash., assignor to Engineering Development Corporation, Seattle, Wash., a corporation of Washington
Filed Aug. 6, 1964, Ser. No. 387,880
5 Claims. (Cl. 29—156.7)

ABSTRACT OF THE DISCLOSURE

A method of making and reconditioning valves for internal combustion engines in which the base metal of the underside of the valve head adjacent to valve stem has a reduced size relative to the desired finished valve dimensions and "hot hard" materials are excessively deposited to the valve head backside while the same is rotated upright, from its periphery to the bell section and to and beyond the juncture of the stem and bell sections, followed by finishing and trimming and polishing steps to bring the valve to the desired finished valve dimensions.

---

This invention relates to a method of making, reconditioning and reinforcing valves used in internal combustion engines wherein such valves are subjected to operating temperatures as high as 1400° Fahrenheit. The purpose of the invention is to extend substantially the operating life of these valves so used by employing this method in their manufacture. These valves are described in my co-pending application Ser. No. 289,838, now U.S. Patent No. 3,147,747 of which this application is a continuation-in-part.

The invention is illustrated, in part, by observing the drawings, wherein.

Figure 3:
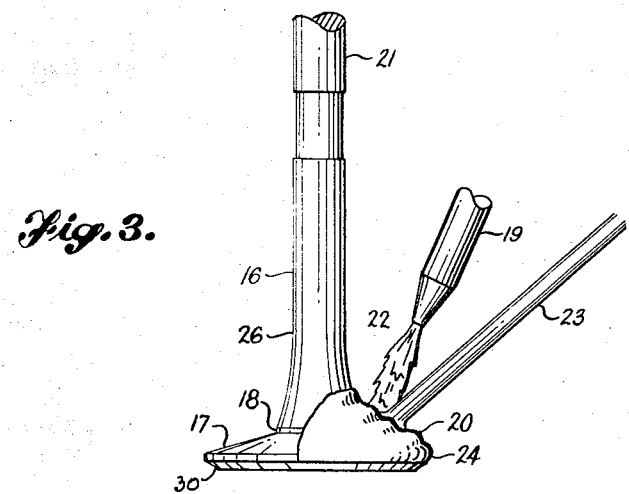
Figure 4:
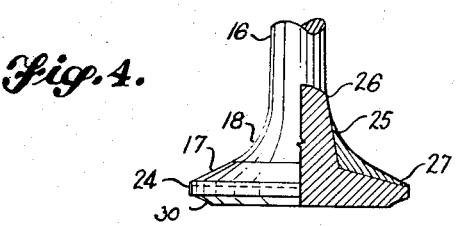

FIGURE 3 indicates, by way of a partial example, the oxygen-acetylene welding method which deposits "hot hard" collar materials during relative rotary motion between valve parts and melted "hot hard" collar materials; and FIGURE 4 is a side elevation of part of a valve made by this method, with portions removed to indicate the final resulting structure of a valve near its working head.

Critical observations of valve failures

Critical observations of valves 10 removed from internal combustion engines during overhaul or emergency repair operations indicated that in many instances an originally flat valve head 11 had become a concave valve heal 12. Such concavity is believed to have resulted from continuing operating shock conditions wherein impact forces during engine operations were primarialy transmitted through a valve seat to the periphery 13 of frustoconical sealing portions 14 of valve 10. These impact forces, often occurring at high operating temperatures in off-center and non-parallel directions, are believed responsible for this valve head distortion. This distortion often results in overall lengths of valve being increased and such increases have been known to equal and to offset clearances originally set by mechanics between valve stems and tappets. Thereafter, without clearance, valve spring forces are ineffective in seating valves. Therefore, once this concave deformation becomes relatively excessive, a valve begins to fail in its sealing valving function permitting an onrush of hot gasses through the created unsealed channeling spaces and on past the valves. Thereafter, burning out of valve portions occurs eventually resulting in excessive leakage and often breakage of the valves.

Avoiding such falures

Compliance with at least one requirement is now known to be necessary in order to avoid, or substantially eliminate this concave-like deformation of a valve head end and thereby increase the operating life of such valves. This requirement is the more extensive use of "hot hard" anti-corrosive, anti-impact shock resistant materials which must be increased in substantial depth and extended beyond their mere utilization at frusto-conical sealing portions of valve heads. Such utilization strengthens each valve for physical impact attacks and provides a heat transfer path which reduces any build-up of excessive heat at high temperatures in and near the sealing surfaces of each operating valve.

Reconditioning valves

This increased use of these so-called "hot hard" materials is undertaken by following these method steps which are undertaken, as necessary, during the reconditioning of valves, (except for a welding torch 19 and a welding rod 23, items of apparatus are not illustrated):

Used valves, which can still be reworked, are dipped into a so-called "hot tank" for a period of time sufficient for its caustic soda solution to remove all rust and carbon deposits;

The valves are then washed by using a neutral solution such as hot water;

Mechanical cleaning and strengthening follows as glass beads are blasted at exposed valve surfaces, care being taken not to expose the sliding-guiding bearing surfaces of each valve stem thereby avoiding their peening and possible pitting;

Inspection follows and is preferably undertaken by using "Zyglo" T.M. equipment of the "Magnaflux" Corporation, wherein valve surfaces are covered with dyes and "black light" observations are made to determine surface irregularities;

Clean valves passing this inspection are then ground on a centerless grinding machine and two thousandths of an inch of material is removed from each valve stem.

The valve stem surfaces thus created by grinding are thereafter chrome plated, adding three thousandths of an inch of material.

Centerless grinding follows to return these chrome plated stem surfaces to a standard size by grinding away one thousandth of an inch. This reworking and refininshing of the stem is particularly directed to improving the sliding-grinding bearing surfaces of the valve stem. The resulting exterior chromium structure, thereafter during engine operations, serves as a heat conducting path to dissipate heat very quickly. Also, this chromium structure tends to reduce friction permitting the valve to close more quickly. Moreover, over longer engine operating periods, observations indicate there is approximately 50% less wear on the valve guide structures of the engine.

Figure 1:
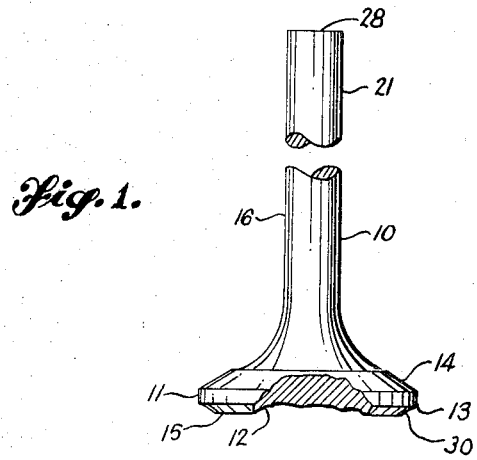
FIGURE 1 is a side elevation of part of a valve removed from an engine to indicate how its original flat valve head was transformed during use to a concave configuration, which, for illustrative purposes, is slightly exaggerated.
Figure 2:
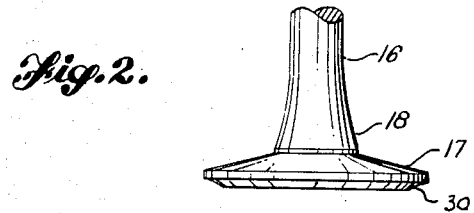
FIGURE 2 is a side elevation of part of a valve of FIGURE 1, after preparatory machining, or of a new valve body blank before the addition of "hot hard" collar materials.

Then the bottom of each valve head 11 and bell portions 18 or commencing portions 18 of the respective valve stem 26 are removed, for example in a lathe machining operation, to one-half of the normal head thickness as illustrated in FIGURE 2. Where valves 10 are being reconditioned for a second time by this method, the "hot hard" materials 20 are not removed down to one-half the normal head thickness but rather are dressed down only to gain uniformity of the "hot hard" materials and a reasonable fresh start for the addition of new "hot hard" materials.

As indicated in FIGURE 3, each valve 10 has a reduced thickness head 17 which is thereafter covered with "hot hard" materials 20 which are deposited over the entire bottom or underside of head 17. Preferably during placement of these "hot hard" materials relative circular motion is maintained between each valve blank 16 and the "hot hard" material source 23 to obtain grain patterns which strengthen the resulting valve 10. The formation of the welded collar is accomplished by establishing a circular-spiral-like configuration whereby the collar constitutes an overlay continuous from the periphery of the head inward to and beyond the junction of the stem and bell sections of the valve body. During this depositing phase, preferably, care is undertaken to preheat each valve head 11 and its near stem or belt portions 18 before applying the welding heat. Also, after welding, by using a heating torch 19 with an oxygen-acetylene flame, a post heating period follows.

Thereafter, coolants such as circulating air are directed over the valve bottom and stem.

In lieu of such free air or circulating air reaching each valve directly, following its post heating period, the valve 10 is placed head down into lime for slow cooling, the lime encompassing its head 11, bell 18 and its stem near the head. Valves so cooled in lime, subsequently are machined with less difficulty.

The valve 10, now oversize at its head 11, outer periphery 24, and around its steam or bell 18 near its head 11, as indicated in FIGURE 3, after the deposit of "hot hard" materials 20, is turned in a lathe and cut back to size at its face, major outside diameter 13 or periphery 13, and its chamfered or frusto-conical sealing portions 27. During these three cutting times, each valve stem 26 is held securely throughout its bearing-sliding portion 21 to maintain or re-acquire a necessary perpendicular relationship between its axis and the plane of the valve face 15 and to keep the sealing surfaces 27 centered about this stem axis.

To avoid excessive deflection and resulting chatter during machining of "hot hard" materials 20, in addition to its exacting alignment support at its bearing-sliding stem portion 21, the valve 10 is supported radially nearer its head by an adjustable support which lets these valve portions near head 11, before machining, seek a position which may or may not be centered with respect to the bearing-sliding stern portion 21. Thereafter, upon lathe machining of these "hot hard" materials 20, an overall alignment is assured with the axial direction of each bearing-sliding portion 21 consequently making the entire valve 10 centered about its axis. The purpose of machining the valve 10 in this way is to overcome the effect of any distortions which may have resulted during the earlier steps and more particularly during welding of newly added "hot hard" materials 20.

After machining the face 15, critical major outside diameter 13, and chamfered valve surfaces 27, with each valve so supported as just described, the valve 10 is then remounted in so-called "soft jaws" radially supporting the valve stem 26 near its added "hot hard" materials 20 while the underside of each valve head 11 and commencing top portions of each stem 26 are machined in a lathe. These surfaces are not dimensionally critical and when so held and machined, there is no danger of these machining operations changing the overall alignment determined when the face 15, outside diameter 13, and chamfer 14 or 27 of the valve head 11 were machined.

Final finishing operations, undertaken following these machining operations, commence with polishing the face 15, outside diameter 13, chamfer 27, underside of head 11 and commencement of top stem 26, by using a rubber wheel which is filled with abrasive. The polishing occurs during relative rotational movement between the valve and rubber wheel.

Next, the valve stem 26 is rotatably held in a wood block support and moved while in contact with a felt wheel so relative motion occuring between the valve stem 26 and felt wheel in the presence of a stainless steel polishing compound is effective in polishing the sliding-gliding bearing surfaces 21 of each valve stem 26.

Final grinding of the sealing valve surfaces is then undertaken to make them concentric with each respective valve stem 26. During final grinding, each valve 10 is held in an alignment determined by a firm grip of a support about its sliding-gliding bearing stem surface 21. While so held, relative rotary motion occurs between the grinding tool and valve.

Final grinding also of the tappet end 28 of each valve 10 is accomplished while the valve 10 and grinder are arranged, so relative motion of a grinder across the tappet end 28 is in a plane perpendicular to the sliding-gliding stem axis.

Final inspection and careful packaging follow to complete this method of reconditioning valves.

*New valves*

New valve blanks like those illustrated, in part, in FIGURE 2, could be made following production methods similar to those used in producing the valves 10 which are reconditioned, as described in the preceding description, altering essentially only their dimensions to provide the surfaces upon which "hot hard" materials are deposited and preferably utilizing chromium as the outer structure of at least the sliding-gliding bearing surfaces of the valve stem.

Therefore, when clean, well inspected new valve blanks 16 are initially made available, the following steps are undertaken to produce these valves 10 as described in my co-pending application Ser. No. 289,838, now U.S. Patent No. 3,147,747.

Each undersize or reduced thickness head 17 of each valve 10 is covered with "hot hard" materials 20 which are deposited over the entire bottom or underside. Preferably, during placement of these "hot hard" materials 20 relative circular motion is maintained between each valve 10 and the "hot hard" material source 20 to obtain grain patterns which strengthen the resulting valve 10. Preferably, during this phase, care is undertaken to preheat each valve head 17 and its near stem 26 portions before applying the welding heat. Also, after welding, a post heating period follows.

Thereafter, cooling is undertaken either by circulating air over the valve underside and its upper stem or placing the valve head 11 and its upper stem 26 into lime for slow cooling. Valves 10, so cooled in lime, are subsequently machined more readily.

After receiving the welded deposit of "hot hard" materials 20, each valve 10 is generally oversize at its head 11 and around the stem 26 near its head, as indicated in FIGURE 3. To re-acquire the near final operating, or working dimensions, the valve 10 is machined in a lathe while held securely throughout its bearing-sliding stem portion 21. While so held, the perpendicular relationship between each valve axis and plane of its valve face 15 is maintained or re-acquired, and in addition sealing surfaces 27 of the valve head 11 are centered about this stem axis.

Additional valve support by other auxiliary members is undertaken to avoid excessive deflection and resulting chatter of the valve head 11. These additional auxiliary members may or may not be centered with respect to the axis of the bearing-sliding stem portion. Machining of valves, so held in this manner, overcomes any radial distortions which originated previously during earlier steps and more likely during welding of added "hot hard" materials 20.

After this machining of each valve face 15, critical major outside diameter 13, and chamfered valve surfaces 27, each valve 10 is then remounted in so-called "soft jaws" which radially support the valve at its stem 26 near its added "hot hard" materials 20. While so held in "soft jaws," the underside of each valve head 11 and commencing top portions of each stem 26 are machined in a lathe. These surfaces are not precisely dimensionally critical and when so held and machined, no overall change in alignment can occur with respect to the face 15, outside periphery 13 and chamfered surfaces 27 remain in their absolute alignment.

Relatively moving rubber wheels filled with abrasive, polish the machined face 15, outside periphery 13 underside of the head 11 and commencing surfaces of the top stem 26.

Thereafter, as the valve stem 26 is rotatably held in a wood block support, it is moved back and forth across a relatively rotating felt wheel in the presence of stainless steel polishing compounds to effectively polish the sliding-gliding bearing surfaces 21 of each valve stem 26.

Final grinding of sealing valve surfaces 27 follows, making them concentric with each respective valve stem 26. During such final grinding of the face or seating area of valve heads, each valve 10 is held in an alignment determined by a firm grip of a support located about its sliding-gliding bearing stem surface 21. While so held, relative rotary motion occurs between the final grinding tool and valve 10. Valve facing machines used in this grinding steps are adjustable so the grinding may be done at specific angles such as 15°, 30° or 45°, in accordance with manufacturing specifications.

Also, final grinding of the tappet end 28 of each valve is accomplished while the valve and grinder are positioned, so relative motion of a grinding tool across the tappet end 28 occurs in a plane perpendicular to the sliding-gliding stem axis.

Final inspection and careful packaging follow to complete this method of making new valves.

Although in discussing this method of reconditioning valves and making new valves, specific machine tools have been referred to as being used to perform certain method steps, there are other machine tools which are also used. For example, after "hot hard" materials have been deposited and cooled, abrasive belt grinding machines are also used in lieu of lathes to return such valve portions to their final dimensions in some surface locations and to near final dimensions in other surface locations where polishing steps should or must still be undertaken.

Abrasive belt grinding machines used are adjustable so their respective driven continuous abrasive belts may be guided to move optionally along substantially any selected path. For example, a grinding belt, during its metal removal operating time, may be adjusted to follow a straight path between two belt control positions. While so traveling, a belt of selective width and grain structure defines a straight planar working surface. Or, belts of like or different widths and grain structure may be directed about circular rollers of various diameters and widths located at their selected working or cutting location to grind, for example, circular recesses.

Using such abrassive belt grinding machines (not shown), the following steps are undertaken to return valves 10 back to size or near size after "hot hard" materials have been deposited and valves have been cooled.

As an abrasive belt travels around its continuous path it is arranged to pass around the circumference of a large roller which is revolving in a vertical plane to present an arcuate moving abrasive cutting belt working surface. A valve, with its stem substantially horizontal is moved so that its face 15 contacts passing belt while the valve is rotated to grind such face perpendicular to stem axis of valve 10.

Thereafter, valve 10 is reorientated through ninety degrees, its stem being then upright, or perpendicular. In this position, it is rotated and moved so its peripheral outside head surface 13 contacts a moving belt which is traveling over a large wheel at its working location. The holding of valve 10 in a jig (not shown) during its rotation and grinding is undertaken wherever possible so accurate, angular relationships are obtained. Such positioning control is undertaken so that after these first two steps, peripheral surface 13 is formed, perpendicular to face 15 and concentric with the valve stem axis.

Again, while a grinding belt is rotating about a large wheel, valve 10, with its axis tipped, is moved and rotated about its own axis so that its exhaust or intake passage sealing surfaced portions 14 are ground to size. Preferably, valve 10 is held and rotated, using a jig which also is designed to include a stop or limit to thereby prevent removal of too much material. Such stops or limits are useful throughout all jig arrangements to control depth of cuts being made by these fast traveling grinding belts.

Then, using a small diameter wheel as a directional change control device for a traveling grinding belt and also tilting valve 10 further, bell portions 18 are accurately ground to size.

Thereafter, again using a large diameter wheel at a working location as both a directional change control and belt back-up device for a grinding belt, valve 10 is moved into belt contact while tilted so its face 15 is not quite perpendicular to a traveling belt and its stem points upwardly. As always, valve 10 is preferably held and rotated in a jig which maintains the valve in its position and controls the ultimate feed advance of valve 10 during grinding. This grinding step, again in lieu of a lathe operation step, forms or reforms chamfered face edges 30.

As necessary, thereafter jig supporting or tooling marks are removed, preferably by like grinding belt operations.

Throughout all these belt grinding steps, various grain size belts of different widths may be used. Also, the belt paths are adjustable to acquire resulting valve head contours.

Subsequently, method steps, previously discussed as occurring after lathe operations, are followed, with possibly one exception. Traveling belt grinding of bell portions 18 often produces a satisfactory surface for an ultimate product, where, for example, a moving, grinding belt creates minute surface contours which are radially spaced and axially directed. Except for possibly this bell portion 18, final finishing operations are preferably undertaken, using a rubber wheel which is filled, or becomes filled, with abrasives.

As set forth in my application Ser. No. 289,838, the "hot hard" material used by way of example, is called "Stellite No. 6," which is understood to contain essentially about 65% cobalt, 30% chromium and 5% tungsten. In using this material, close temperature control within the melting temperature range of the collar "hot hard" material is necessary while "Stellite" is being laid down as a welding deposit on the valve. If this is done, then substantially no intermingling of metals will result. "Stellite" will remain substantially free of valve body alloys and therefore will keep its special properties which are required at full red heat operating conditions encountered around the valve heads during engine operations. Such operations often entail 2,000 forceful blows per minute at 30,000 pounds per square inch at or near 1400° Fahrenheit.

By way of example, the valve stems and their contiguous head portions, before receiving the "hot hard" materials, are derived from an austenitic steel alloy which, upon heat treating in the head portions, becomes a ferretic steel alloy. The composition of such an alloy would have, in addition to iron, for example: chromium at 18%; nickel at 4%; molybdenum at 3%; and perhaps nitrogen at 0.15%.

It is to be noted these method embodiments are applicable to both exhaust and intake valves. These valves are distinguishable with respect to their size, contour and composition. In respect to composition, exhaust valve bodies are made of stainless steel materials in head and adjacent stem portions and the balance of each stem is made of carbon steel. These two materials in the stem are butt welded together during their original manufacture. Whereas, intake valves, which are smaller in some dimensions, have valve bodies which are made generally only of carbon steel. These differences reflect the severity of their respective engine operating conditions.

In summary, this method for either reconditioning valves or making new valves, wherein "hot hard" materials are first deposited and then further formed about the underneath of valve heads, bell portions and for around the commencement of top portions of each valve stem, provides resulting valves which maintain their strength under severe operating conditions to outstandingly prolong their operating life.

I claim:

1. The method of making a metallic body such as a poppet valve for an internal combustion engine or the like, using at least two distinguishable portions of at least two unlike alloys, comprising the steps of:
   (a) forming from a body of alloyed metal having a predetermined coefficient of expansion and high strength and ductility an initial valve body blank including:
      a stem section, and an integral undersize bell section merging with a substantially full diameter head thinner than the desired finished valve;
   (b) rotating the valve blank about its axis with the stem upward and flame-weld depositing a welded metal alloy collar of substantial thickness continuously around the backside of the head from its periphery to the bell section and to and beyond the juncture of the stem and bell sections, said metal alloy collar having a higher coefficient of expansion and greater anti-erosive and shock resistant properties than the alloyed metal of the valve body and containing principally cobalt and chromium;
   (c) machining the multiple portioned metallic body to near final specification dimensions; and
   (d) polishing the valve sealing surfaces to final dimensions.

2. The method of claim 1 in which the depositing of the welded metal alloy collar progresses in a spiral configuration inward and continuous from the head periphery to and beyond the junction of the stem and bell sections.

3. A method of reconditioning a metallic body such as a poppet valve for an internal combustion engine, comprising the steps of:
   (a) dipping "used" valves, which can still be reworked, into a so-called "hot tank" for a period of time sufficient to remove all rust and carbon depositions through the action of its caustic soda solution;
   (b) washing these dipped valves in a neutral solution such as hot water;
   (c) mechanically cleaning and strengthening the washed valves by blasting their exposed valve surfaces with glass beads, taking care not to expose the sliding-gliding bearing surfaces, thereby avoiding their peening and possible pitting;
   (d) inspecting the cleaned valves for surface irregularities preferably using dyes and "black light" inspection procedures;
   (e) grinding two thousandths of an inch of material from each valve stem preferably on centerless grinding equipment;
   (f) plating three thousandths of an inch of chromium on each valve stem;
   (g) grinding one thousandth of an inch of chromium from each valve stem, preferably on centerless grinding equipment;
   (h) cutting away the bottom underside of each valve head and bell portions and possibly commencing top stem portions preferably in a lathe-turning operation removing material to a maximum one-half of the normal head thickness;
   (i) welding "hot hard" materials to the valve to excessively replace the valve blank materials cut away, preferably preheating each valve head, then depositing the "hot hard" materials at welding heat upon relative rotary motion, and post heating the welded valve followed by cooling in lime;
   (j) cutting the welded valve, preferably in a lathe operation, to size and to align its face, outer periphery and chamfered sealing surfaces, the valve being accurately rotatably held about its sliding-gliding bearing stem axis and also supported at its bell portion;
   (k) cutting the welded valve, preferably in a lathe operation, to "trim up" and "fair in" the "hot hard" materials on the underside of the head and bell portions as the valve is rotated while held in soft jaws;
   (l) polishing the face, outer periphery, underside of the head and commencing surfaces of the top stem portions, using, preferably, a relatively moving rubber polishing wheel which is filled with abrasives;
   (m) polishing the sliding-gliding bearing surfaces of each valve stem by preferably using a relatively moving felt polishing wheel in the presence of stainless steel type polishing compounds;
   (n) grinding the sealing surfaces of the valve as the valve is accurately positioned by holding its sliding-gliding bearing stem surfaces so the sealing surfaces may be ground concentric to the axis of the stem; and
   (o) grinding of the tappet end by relative motion of a grinding tool in a plane perpendicular to the sliding-gliding-bearing stem axis.

4. The method of reconditioning a metallic body such as an engine valve for an internal combustion engine, comprising steps of:
   (a) dipping "used" valves, which can still be reworked, into a so-called "hot tank" for a period of time sufficient to remove all rust and carbon depositions through the action of its caustic soda solution;
   (b) washing these dipped valves in a neutral solution such as hot water;
   (c) mechanically cleaning and strengthening the washed valves by blasting their exposed valve surfaces with glass beads, taking care not to expose the sliding-gliding bearing surfaces, thereby avoiding their peening and possible pitting;
   (d) inspecting the cleaned valves for surface irregularities preferably using dyes and "black light" inspection procedures;
   (e) grinding two-thousandths of an inch of material from each valve stem, preferably on centerless grinding equipment;
   (f) plating three-thousandths of an inch of chromium on each valve stem;
   (g) grinding one-thousandth of an inch of chromium from each valve stem, preferably on centerless grinding equipment;
   (h) cutting away the bottom underside of each valve head and bell portions and possibly commencing top stem portions, preferably in a lathe-turning operation, removing material to a maximum one-half of the normal head thickness;
   (i) welding "hot hard" materials to the valve to excessively replace the valve blank materials cut away, preferably preheating each valve head, then depositing the "hot hard" materials at welding heat upon relative rotary motion, and post heating the welded valve followed by cooling in lime;
   (j) removing materials essentially from the valve head to resize the welded valve, preferably using driven continuous grinding belt machines which are selectively operated along various paths determined by adjustments of their directional control roller guides and which selectively use belts of various widths and different surface cutting grain sizes, the valves being rotated while held in various positions in jigs and advanced into the path of the grinding belt;

(k) polishing the valve surfaces near and around the head, using, preferably, a relatively moving rubber polishing wheel which is filled with abrasives;

(l) polishing the sliding-gliding bearing surfaces of each valve stem by preferably using a relatively moving felt polishing wheel in the presence of stainless steel type polishing compounds;

(m) grinding the face-seating-sealing surface areas of the valve head in a valve facing machine at the angle given in respective manufacturers' specifications, making such surfaces concentric with the valve stem as the valve is relatively rotated, and (n) grinding of the tappet end by relative motion of a grinding tool in a plane perpendicular to the sliding-gliding-bearing stem axis.

5. The method of reconditioning a metallic body such as an engine valve for an internal combustion engine, as claimed in claim 4, wherein the removing of materials to resize the welded valve by operation of continuous belt grinders more specifically involves the following at the working-cutting location:

(j-1) advancing the valve, while rotatably held in a jig with its stem axis horizontal, so that the valve face contacts the traveling belt as it passes over a large diameter wheel and advances a definite controlled distance;

(j-2) tilting down the stem and advancing the valve, while rotatably held in a jig with its stem axis vertical, so that the valve periphery contacts the traveling belt as it passes over a large diameter wheel and advances a definite controlled distance;

(j-3) tilting and then advancing the valve, while rotatably held in a jig with its stem axis upward and tilted, so the valve sealing surfaces contacts the traveling belt as it passes over a large diameter wheel and advances a definite controlled distance;

(j-4) tilting further and then advancing the valve, while rotatably held in a jig with its stem axis upward and tilted, so the valve bell surfaces contact the traveling belt as it passes over a small diameter wheel and advances a definite controlled distance; and (j-5) tilting in the opposite direction and then advancing the valve, while rotatably held in a jig with its stem axis upward and tilted, so the valve face near edge surfaces angularly contact the traveling belt to perfect a slight tapered surface as the belt passes over a large diameter wheel, the valve being advanced a definite controlled distance.

References Cited
UNITED STATES PATENTS

| | | |
|---|---|---|
| 1,106,064 | 8/1914 | Thompson. |
| 2,273,250 | 2/1942 | Charlton _____ 29—156.7 X |
| 2,277,571 | 3/1942 | Wagner _____ 29—156.7 X |
| 2,301,909 | 11/1942 | Wissler et al. _____ 29—156.7 X |
| 2,358,090 | 9/1944 | Longoria _____ 29—156.7 X |
| 2,431,781 | 12/1947 | Wagner _____ 29—156.7 X |
| 2,633,633 | 4/1953 | Bogart et al. _____ 29—156.7 X |

JOHN F. CAMPBELL, *Primary Examiner.*

J. D. HOBART, *Examiner.*